United States Patent [19]
Egger

[11] 3,916,721
[45] Nov. 4, 1975

[54] LOCKABLE ROTATABLE KNOB
[75] Inventor: Erwin Egger, Bulle, Switzerland
[73] Assignee: Decobul S.A., Switzerland
[22] Filed: July 3, 1974
[21] Appl. No.: 485,622

Related U.S. Application Data
[63] Continuation-in-part of Ser. No. 394,646, Sept. 5, 1973, abandoned.

[30] Foreign Application Priority Data
May 22, 1974 Switzerland.......................... 7024/74

[52] U.S. Cl. ..................... 74/553; 116/115; 188/74; 188/75; 403/350; 403/373; 403/374; 403/DIG. 8
[51] Int. Cl.² ......................................... G05G 1/10
[58] Field of Search ...... 74/553, 554; 403/350, 373, 403/374, DIG. 8; 116/115; 188/74, 75

[56] References Cited
UNITED STATES PATENTS

| | | | |
|---|---|---|---|
| 3,289,137 | 11/1966 | Jones et al. .................... | 188/74 X |
| 3,402,692 | 9/1968 | Hickman et al. .................... | 116/115 |
| 3,557,746 | 1/1971 | Jungblut .............................. | 116/115 |

*Primary Examiner*—Benjamin W. Wyche
*Assistant Examiner*—F. D. Shoemaker
*Attorney, Agent, or Firm*—Robert E. Burns; Emmanuel J. Lobato; Bruce L. Adams

[57] ABSTRACT

Control knob apparatus for mounting on a control shaft of an instrument such as a potentiometer. A control knob is rotatably mounted in a housing and has an outer cylindrical brake surface in the housing. A first ring is provided in the housing and has resilient brake fingers thereon, disposed outside of and adjacent to the brake surface. A second ring surrounds the brake fingers and has cam surfaces thereon, which resiliently urge the brake fingers into braking contact with the cylindrical surface, on arcuate displacement of the second ring in one rotary direction.

7 Claims, 4 Drawing Figures

LOCKABLE ROTATABLE KNOB

CROSS REFERENCE TO PRIOR APPLICATION

This is a continuation-in-part of the application Ser. No. 394,646 filed Sept. 5, 1973 now abandoned.

BACKGROUND OF THE INVENTION

It has been found desirable to lock control knobs into a position once set, so as to avoid displacement caused by vibrations and the like. However it has been difficult to make a lockable rotatable knob so as to allow and maintain finer adjustments and not to disturb such adjustments by the locking or unlocking operation. It has also been found difficult to make such apparatus in compact form and yet to provide for easy access to the locking mechanism as well as the knob itself.

NATURE OF THE INVENTION

It is an object of the invention to provide an improved lockable rotatable knob which is free of the problems and troubles of early apparatus of this type.

The locking device of the apparatus can be constructed for rotatable shifting, which is generally preferred, or for longitudinal shifting. Outer knurled surfaces, on the outside of the knob housing, are advantageously used in either case.

BRIEF DESCRIPTION OF THE DRAWINGS

FIG. 3 is a sectional view, drawn on a smaller scale, the section being taken along lines III—III in FIG. 1.

DESCRIPTION OF THE PREFERRED EMBODIMENTS

Figure 1:
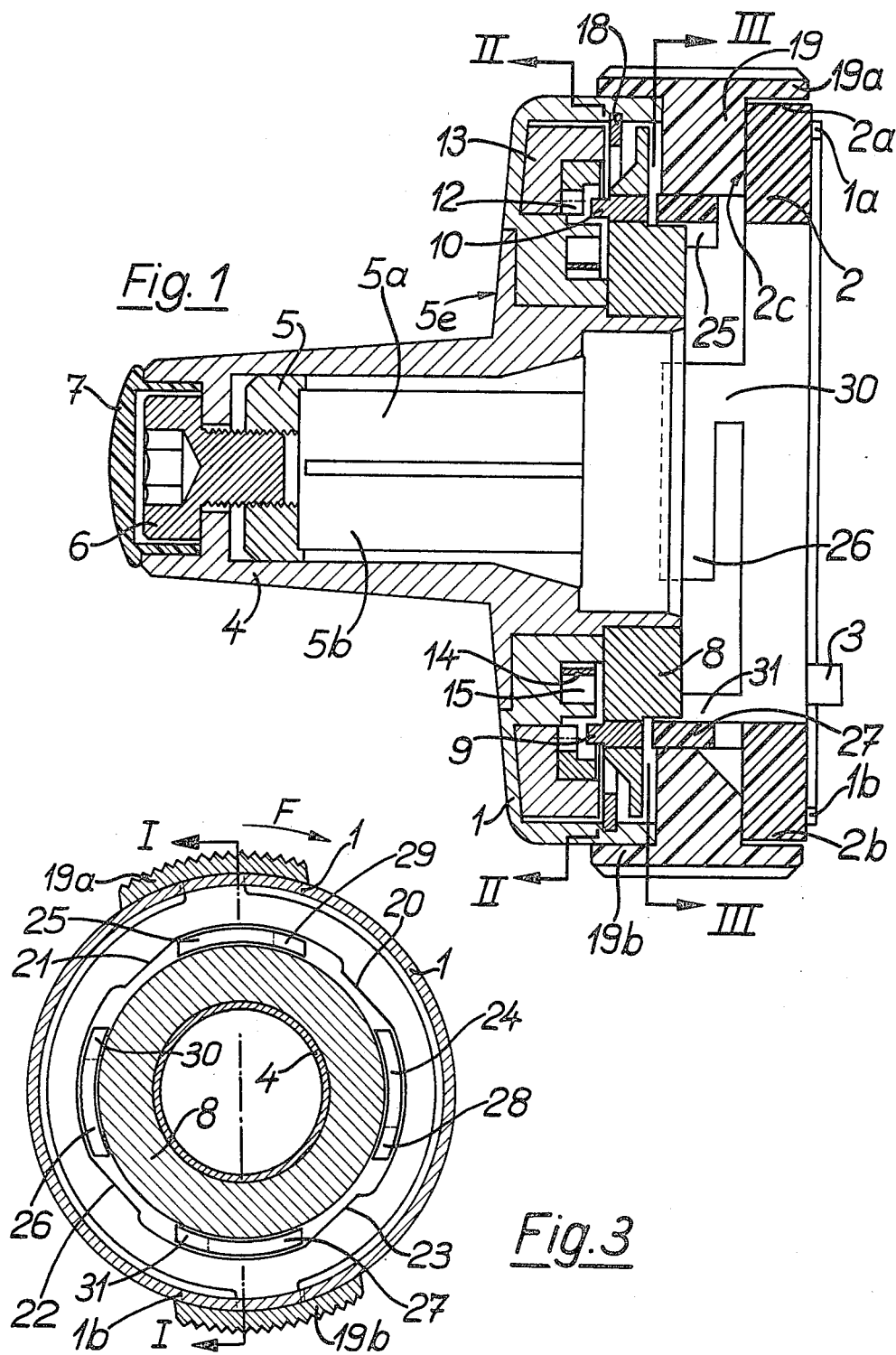
FIG. 1 is a sectional view of a first embodiment of the new apparatus, the section being taken along lines I—I in FIG. 3.
Figure 2:
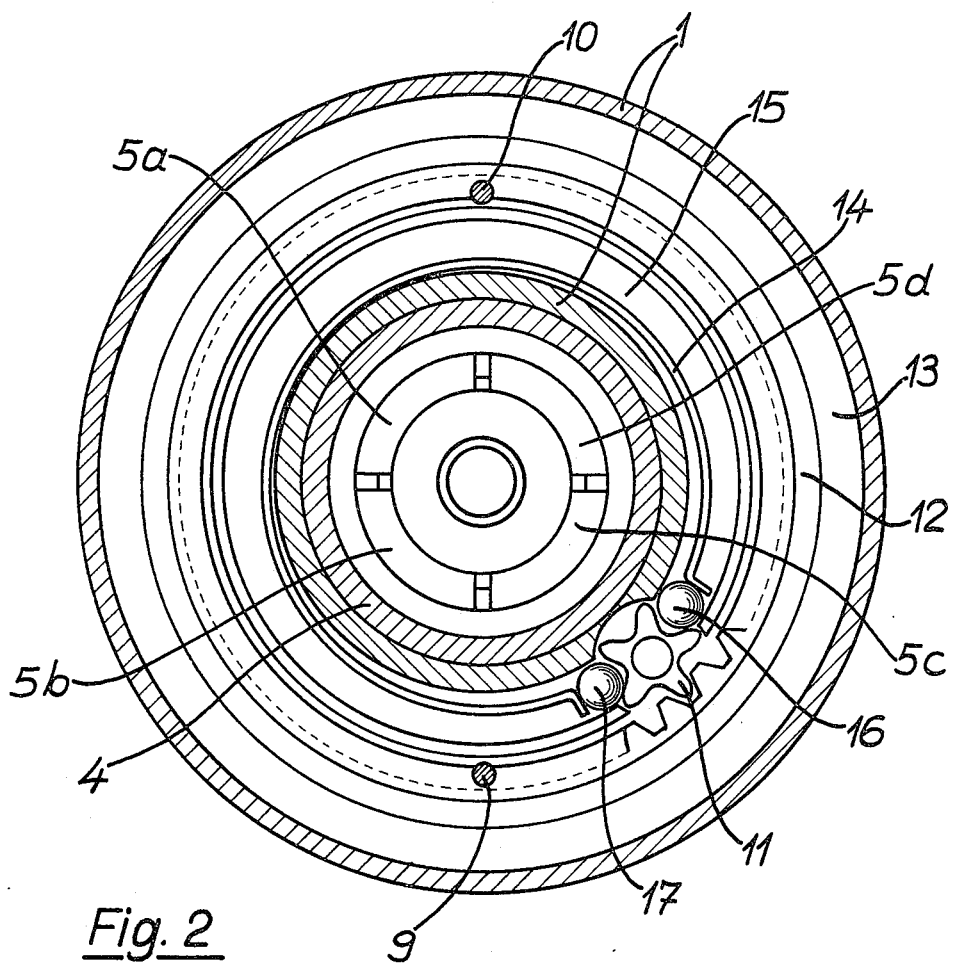
FIG. 2 is a sectional view taken along lines II—II in FIG. 1.

Referring first to FIGS. 1 and 2: the apparatus comprises a housing 1 of annular form, made for example as a metal casting and suitably installed around the control input shaft of the instrument to be set by the control knob, for example the shaft of a potentiometer (not shown). A back end of housing 1, adjacent to the control panel, constitutes an annular piece 2, desirably made for example of resilient synthetic plastic material. As shown in the drawing this piece 2 is secured to housing 1 by means of two extensions 2a, 2b. These extensions interlock with cutouts 1a, 1b in housing 1. A dowel 3 may be provided for securing the plastic ring 2 and the metal housing 1 thereon against rotation relative to the control board.

Rotatably inserted in housing 1 is a hollow stem 4 of the control knob and which may be produced as another metal casting, with sliding rotary fit on shouldered inner walls of housing 1, as shown. Concentrically within the hollow stem 4 a clamp 5 is provided, with tongues 5a, 5b, 5c and 5d longitudinally extending for engagement with the input shaft. A bolt 6 coaxially inserted in the front end of stem 4 has threaded engagement with clamp 5 to slightly pull this clamp in a forward direction by the tightening of the bolt and thereby to effect clamping of the tongues 5a . . . 5d on the instrument shaft. The clamping is aided by coacting inclined surfaces of these tongues and of the hollow stem 4, adjacent the back end of this stem, as shown. A plastic cap 7 in front of the knob conceals the bolt 6.

According to the invention a ring 8 having a cylindrical outer brake surface is press-fitted onto the back end of knob element 4, for the double purpose of holding this element against forward withdrawal from housing 1 and also importantly, for locking the knob in desired positions. Details of the locking mechanism will be described hereinafter in connection with FIG. 3.

Preferably the ring 8 has two pins 9 and 10 secured to it in diametrically opposite positions. In the path of these pins, when button unit 4, 8 is rotated in housing 1 and as best shown in FIG. 2 the teeth of a pinion 11 are provided, this pinion being suitably pivoted in the housing. The teeth of the pinion are long enough to also mesh with interior gear teeth of a gear 12 secured to a ring 13. By means of markings on an outer face of this ring and further means of a window in housing 1 (not shown) the successive rotations of the ring, and accordingly of the knob, can be indicated. Each time that knob 4 completes a half revolution, pinion 11 is moved forward by one tooth, and causes forward movement, again by one tooth, of gear 12 and ring 13. In order to make sure that pinion 11 advances by exactly one tooth, upon each passage of a pin 9 or 10, there is provided a spring lock mechanism including an arcuate spring 14 suitably secured to housing 1 opposite pinion 11 and having two outwardly bent end portions, movable in an annular mounting space 15. Each outwardly bent end portion holds a ball bearing 16 or 17 against pinion 11, resiliently holding these ball bearings between pairs of teeth of the pinion. The indicator ring 13 and its inner gear 12 are held against axial movement in housing 1 by a split ring 18.

Referring now to FIGS. 1 and 3 the new lockable knob includes a manually turnable annular piece 19 advantageously made of suitable synthetic plastic and interposed between the housing and support pieces 1 and 2, as outer supports, and the rotatable knob and ring structure 4, 8. This piece 19 has a pair of radial projections 19a, 19b diametrically opposite one another, which extend longitudinally along the outer cylindrical walls of the housing and support structure 1, 2 and which have knurled outer surfaces as shown. These surfaces are engageable manually, for example with the tip of the fore-finger and thumb of one hand, for rotating the ring 19.

when such rotation is effected in the direction of arrow F, internal inclined surfaces 20, 21, 22 and 23 of ring 19 encounter fingers 24, 25, 26, 27 secured to support ring 2 by connectors 28, 29, 30, 31, and press these fingers against the outside surface of the rotatable ring 8 on the knob 4, thereby immobilizing the knob. For this purpose the fingers are relatively flexible and each of them extends over a major part of a quadrant of the circle. Their inward displacement caused by their encountering the inclined surfaces of the rotatable ring 19, is purely radial, as each finger is secured to the stationary ring 2 by its connector. Thus the construction avoids accidental misadjustment of the knob, in the process of locking it.

Figure 4:
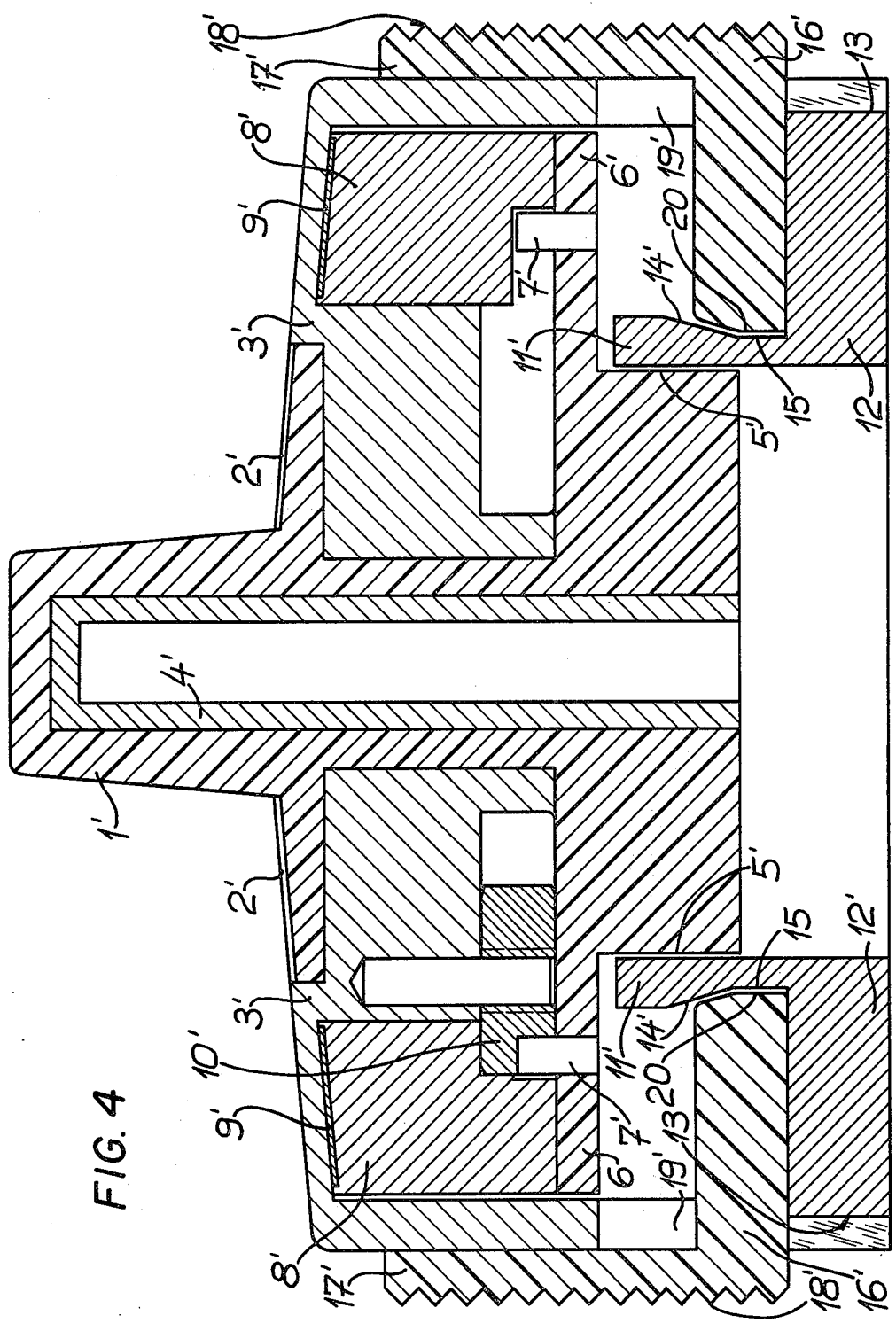
FIG. 4 is a section generally similar to that of FIG. 1 but showing a second embodiment of the invention.

Referring now to FIG. 4: in this embodiment rotatable knob 1', with annular setting scale 2' thereon is mounted in a stationary hollow housing 3', shown in somewhat more diagrammatic form than in FIG. 1. A sleeve insert 4' secures the knob to an instrument shaft (not shown). The knob has a cylindrical surface 5', which of course could also be replaced by a conical surface. A flange 6' extending outwardly from cylinder 5' carries one or two pins 7' for the digital stepping on of a rotatably mounted indicator ring 8' with a dial scale 9' thereon, by a transmission pinion 10'.

In this embodiment the peripheral surface 5' of knob 1' is surrounded concentrically by collar means 11' extending parallel to the axis of the knob and secured to housing 3' by ring structure 12'. Collar means 11' can be resiliently urged radially inwardly against the surface 5' of the knob 1', just as fingers 25, 26, 27, 28 according to FIG. 3 can be urged against the surface of ring 8. In order to facilitate flexible urging of the axially extending finger structure 11' this structure may comprise a plurality of fingers disposed next to one another around the inner circumference of the ring 12. A portion 14' of the external circumference of the collar means 11' is of tapered or frusto-conical form and is shown as widening out in the direction toward the front of the knob.

A ring 17' with a knurled surface 18' surrounds the housing 3 and is slidable on the outer surface of this housing, in directions parallel to the axis of the knob while being held against rotation. For this purpose the ring 17' has inwardly extending arms 16' extending through elongate slots 19' in the housing. Within the housing the ring structure 16', 17' has an inwardly projecting portion which has a bevel surface 20 opposite the frusto-conical surface 14' of the collar means 11'. By means of this construction the knob can be locked by manually shifting ring 17' forwardly, guided by channels 13 on housing 3' thereby radially inwardly displacing conical portions 14' between ring 12' and collar means 11' against surface 5', as similarly conical portions of bevel surface 20 bear against portions 14'. In order to release the locking ring, it then is displaced rearwardly (downwardly in FIG. 4) thereby allowing collar means 11' to resiliently release the surface 5'.

In both embodiments strong locking is achieved, without any disturbance of the position of the knob. It is achieved by knurled ring elements extending a small distance beyond the control knob. It is possible to locate a plurality of the new knobs side-by-side, without any significant loss of space, and thereby to obtain excellent utilization of a control panel.

What I claim and desire to secure by Letters Patent is:

1. Control knob apparatus comprising; a housing having a generally cylindrical outside surface; a control knob coaxial with said housing, an end of said knob being mounted in said housing and having an outer cylindrical brake surface; a stationary brake ring, coaxially secured to said housing and having a plurality of resilient brake fingers thereon, disposed outside of and adjacent to said outer cylindrical brake surface, each finger extending over an arcuate portion of said surface; a shiftable brake actuator ring coaxially surrounding said resilient brake fingers; mutually coacting cam means on said shiftable ring and on said resilient brake fingers for resiliently radially urging said resilient brake fingers into braking contact with said cylindrical brake surface, on displacement of said brake actuator ring in one direction over a limited distance which is minor compared with the circumference of said cylindrical brake surface, to lock the knob, and for resiliently releasing said brake means on displacement of said shiftable brake actuator ring in an opposite direction over said limited distance; and means coaxial with and adjacent to the outside surface of the housing and manually engageable for displacing said shiftable brake actuator ring in either direction over said limited distance.

2. Control knob apparatus according to claim 1, wherein said shiftable ring is shiftable circumferentially about the axis of said knob over said limited distance.

3. Control knob apparatus according to claim 1, wherein said shiftable ring is shiftable longitudinally along the axis of said knob over said limited distance.

4. Control knob apparatus according to claim 1, in which said shiftable ring has externally knurled portions thereon.

5. Control knob apparatus according to claim 4, in which said externally knurled portions constitute a pair of portions disposed on diametrically opposite portions of said shiftable ring.

6. Control knob apparatus according to claim 1, in which said shiftable ring consists of synthetic plastic material.

7. Control knob apparatus according to claim 1, additionally including means controlled by said control knob for indicating the operations of said control knob.

* * * * *